(12) United States Patent
Harvey

(10) Patent No.: US 11,603,066 B2
(45) Date of Patent: Mar. 14, 2023

(54) VIBRATION DAMPER FOR COUPLING AN AIRBAG MODULE TO A VEHICLE STEERING WHEEL

(71) Applicant: ZF Passive Safety Systems US Inc., Washington, MI (US)

(72) Inventor: Jeffery Harvey, Sterling Heights, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/382,103

(22) Filed: Jul. 21, 2021

(65) Prior Publication Data

US 2023/0027744 A1    Jan. 26, 2023

(51) Int. Cl.
B60R 21/203    (2006.01)

(52) U.S. Cl.
CPC ................. B60R 21/2037 (2013.01)

(58) Field of Classification Search
CPC .......... B60R 21/2035; B60R 21/2037
See application file for complete search history.

(56) References Cited

U.S. PATENT DOCUMENTS

| | | | | |
|---|---|---|---|---|
| 5,931,492 | A * | 8/1999 | Mueller | B60R 21/2037 200/61.55 |
| 6,464,247 | B1 * | 10/2002 | Laue | B62D 7/222 280/728.2 |
| 7,464,959 | B2 * | 12/2008 | Pillsbury, IV | B60Q 5/003 200/61.55 |
| 8,720,942 | B2 | 5/2014 | Onohara | |
| 11,180,178 | B2 * | 11/2021 | Kiyohara | B62D 7/222 |
| 2014/0306432 | A1 * | 10/2014 | Obayashi | B60R 21/203 280/728.2 |
| 2016/0031399 | A1 * | 2/2016 | Andersson | B60R 21/2037 280/728.2 |
| 2017/0036687 | A1 * | 2/2017 | Obayashi | B62D 7/222 |
| 2020/0346605 | A1 * | 11/2020 | Hirota | B62D 7/222 |
| 2021/0024128 | A1 * | 1/2021 | Schutz | B62D 1/11 |
| 2021/0039704 | A1 * | 2/2021 | Kiyohara | B62D 7/222 |
| 2021/0269080 | A1 * | 9/2021 | Kim | B60R 21/2037 |
| 2022/0055564 | A1 * | 2/2022 | Hayakawa | B60R 21/2037 |

FOREIGN PATENT DOCUMENTS

| | | | |
|---|---|---|---|
| JP | 2015145173 A | 8/2015 | |
| JP | 6454073 B2 | 1/2019 | |
| JP | 2019162914 A * | 9/2019 | ........... B60R 21/203 |
| JP | 6637665 B2 | 1/2020 | |
| WO | 2016002507 A1 | 1/2016 | |
| WO | 2016166915 A1 | 10/2016 | |

* cited by examiner

*Primary Examiner* — Barry Gooden, Jr.
(74) *Attorney, Agent, or Firm* — Tarolli, Sundheim, Covell & Tummino LLP

(57) ABSTRACT

A damper assembly configured to mount an airbag module to a steering wheel including a steering wheel armature includes a damper element configured to engage the steering wheel armature and to extend through an opening in the steering wheel armature. The damper assembly also includes a pin configured to be connected to the airbag module and a cap structure configured to extend through the opening in the steering wheel armature. The cap structure is configured to receive the pin for axial movement so that the airbag module can move axially relative to the steering wheel armature. The damper element isolates the airbag module, the pin, and the cap structure from the steering wheel armature.

22 Claims, 8 Drawing Sheets

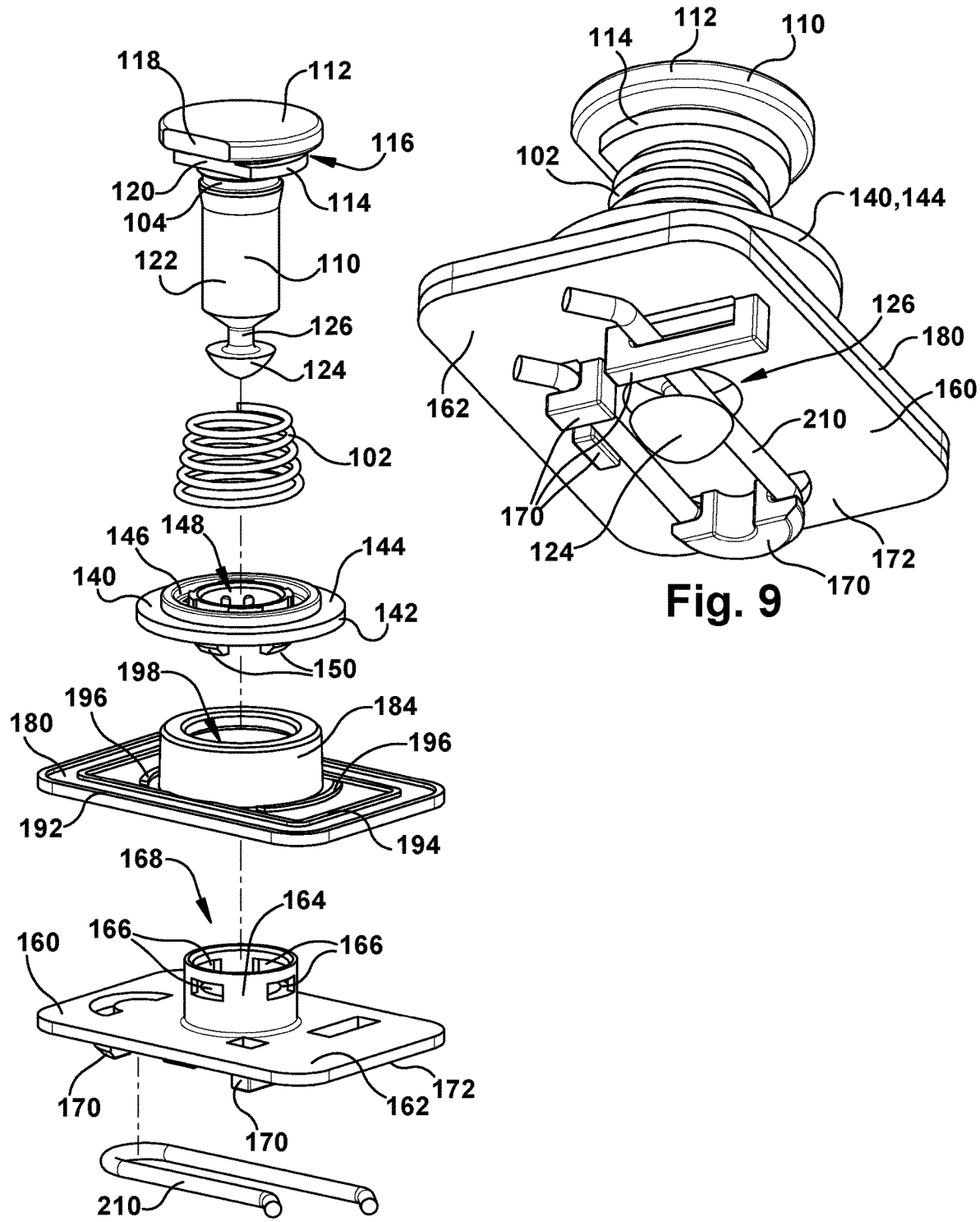

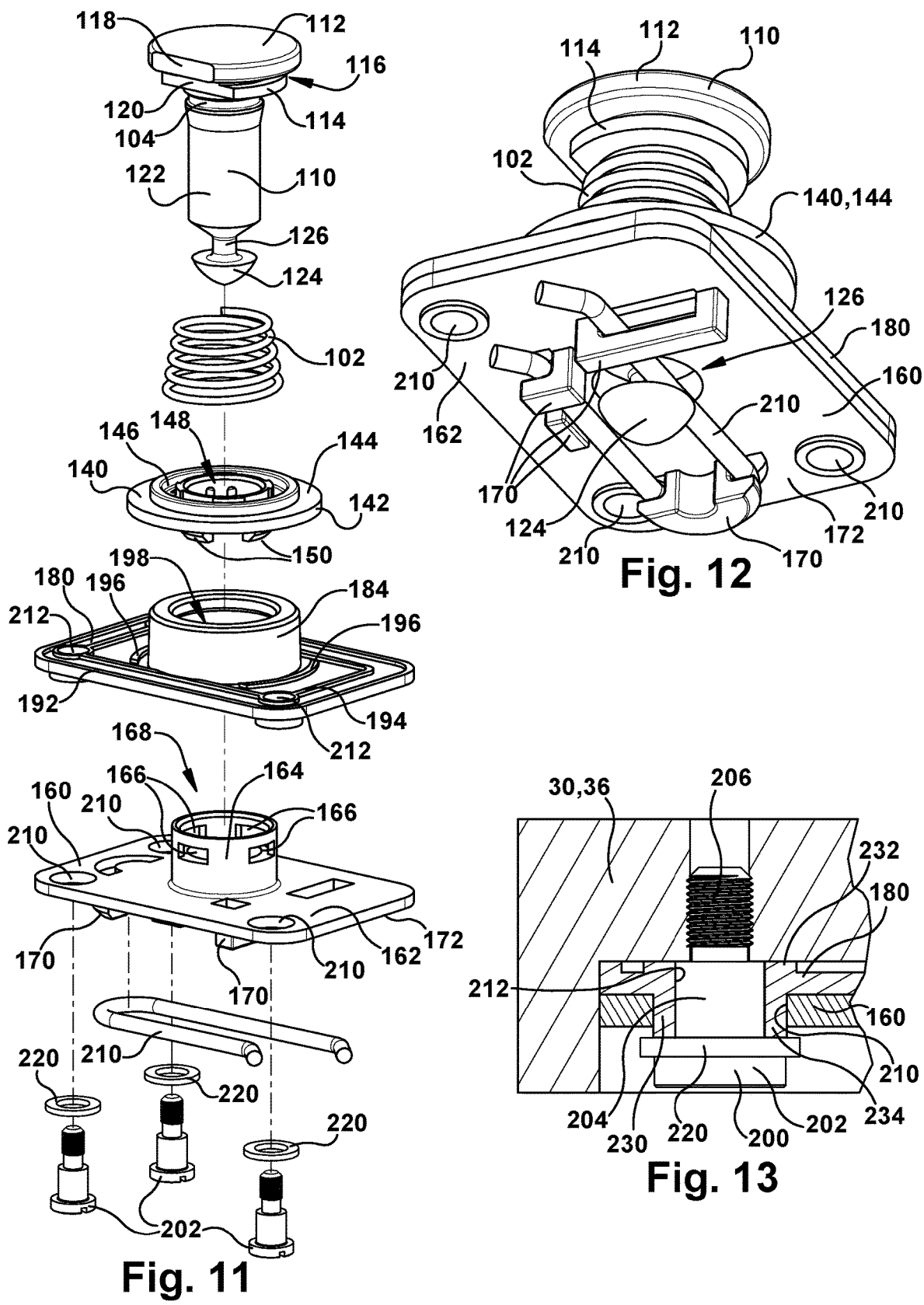

VIBRATION DAMPER FOR COUPLING AN AIRBAG MODULE TO A VEHICLE STEERING WHEEL

TECHNICAL FIELD

The invention relates to a vibration damper for coupling an airbag module to a vehicle steering wheel.

BACKGROUND

It is desirable to eliminate or reduce steering wheel vibrations that can be felt by the driver. These vibrations can, inter alia, occur as a result of the rigid coupling of the steering wheel to the steering column. To combat this, vibration dampers can be used to avoid undesired steering wheel vibrations by adjusting the natural frequency of the overall system so that it is within an uncritical range. For example, steering wheel mounted airbag modules can be isolated from the steering wheel by vibration dampers, so that the module can be used as a damper mass that counter-oscillates vibrations imparted to the steering wheel through the steering column.

Vibration dampers for steering wheel mounted airbag modules can also be used to provide vehicle horn functionality. In this case, the airbag module can include a horn contact, with a mating contact being provided at the steering wheel structure. In doing so, however, there is a need to balance the force required for the driver to actuate the horn with the potential of the horn switch self-actuating in response to driving conditions, such as a rough road.

SUMMARY

A damper assembly configured to mount an airbag module to a steering wheel including a steering wheel armature includes a damper element configured to engage the steering wheel armature and to extend through an opening in the steering wheel armature. The damper assembly also includes a pin configured to be connected to the airbag module and a cap structure configured to extend through the opening in the steering wheel armature. The cap structure is configured to receive the pin for axial movement so that the airbag module can move axially relative to the steering wheel armature. The damper element isolates the airbag module, the pin, and the cap structure from the steering wheel armature.

According to one aspect, the damper element can be configured to engage a lower surface of the steering wheel armature, to extend through the opening in the steering wheel armature, and to have a portion that extends from the opening above an upper surface of the steering wheel armature.

According to another aspect, the cap structure can include a lower cap configured to overlie the damper element on the lower surface of the steering wheel armature. The lower cap can extend at least partially through the damper element and the opening in the steering wheel armature. The cap structure can also include an upper cap configured to overlie and engage the portion of the damper element extending above the upper surface of the steering wheel armature. The upper cap can extend at least partially through the damper element and the opening in the steering wheel armature, and can be configured to engage and lock onto the lower cap to connect the upper cap, the lower cap, and the damper element to the steering wheel armature.

According to another aspect, the damper element can isolate the airbag module from the steering wheel armature on both the upper surface and the lower surface of the armature.

According to another aspect, the pin can be configured to extend through the upper cap, the damper element, and the lower cap to connect the airbag module to the steering wheel aperture.

According to another aspect, the damper assembly can also include a spring that encircles a portion of the pin. The spring can have a lower end that engages the upper cap and an upper end that is proximate to and engages, directly or indirectly, the airbag module. The spring can allow the airbag module to move axially relative to the steering wheel armature.

According to another aspect, the damper assembly can also include a spring that encircles a portion of the pin. The airbag module can be configured to move axially relative to the steering wheel armature against the bias of the spring. The spring can allow the airbag module to function as a horn switch actuator.

According to another aspect, the damper assembly can include a retainer pin that engages retainer pin receiving structures on a lower surface of the lower cap. The retainer pin can engage a slot in the pin to secure the connection of the airbag module to the steering wheel armature.

According to another aspect, the damper element can include a base that engages the lower surface of the steering wheel armature. the lower cap can include a base that overlies the damper element base, positioning the damper element base between the lower cap base and the lower surface of the steering wheel armature.

According to another aspect, the damper element can include a plurality of ribs that extend from an upper surface of the damper element base and engage the lower surface of the steering wheel armature.

According to another aspect, the damper element can include a cylindrical sleeve that extends from upper surface of the damper element base. The sleeve can be configured to be positioned in and engage a sidewall of the opening in the steering wheel armature.

According to another aspect, the sidewall of the steering wheel armature can include a small diameter upper sidewall, a large diameter lower sidewall, and an annular shoulder that extends from the upper sidewall to the lower sidewall. The lower surface of the steering wheel armature that the damper element base engages can be the shoulder.

According to another aspect, the damper element sleeve can be configured to extend from the opening in the steering wheel armature above the upper surface of the steering wheel armature.

According to another aspect, the upper cap can be configured to support the airbag module via the spring on the upper end portion of the cylindrical sleeve of the damper element.

According to another aspect, the upper end portion of the cylindrical sleeve of the damper element can space an annular rim portion of the upper cap from the upper surface of the steering wheel armature.

According to another aspect, the upper cap can include an annular rim and a plurality of latches that extend from a lower surface of the annular rim into the cylindrical sleeve of the damper element. The lower cap can include a cylindrical pin receiving structure that extends upward from the base plate into the cylindrical sleeve of the damper element. The latches of the upper cap can engage latch windows in the pin receiving structure to connect the upper cap to the lower cap, with the annular rim of the upper cap engaging an upper end portion of the cylindrical sleeve of the damper element, and the base of the lower cap engaging the base of the damper element.

According to another aspect, a fastener can extend through aligned fastener receiving openings in the lower cap and the damper element to connect the damper assembly to the steering wheel aperture. The damper assembly can be configured so that the only component of the damper assembly in direct engagement with the fastener is the damper element.

According to another aspect, the damper assembly can be configured so that the damper element isolates the airbag module from the fastener.

According to another aspect, the fastener can include a head portion, a shoulder portion, and a threaded shank. The threaded shank can be configured to be installed in a corresponding threaded opening in the steering wheel armature, and the shoulder can be configured to engage and be tightened against the steering wheel armature.

According to another aspect, the damper element can include a sleeve portion that extends through the fastener receiving opening in the lower cap. The damper assembly can be configured so that the shoulder portion of the fastener engages the sleeve portion of the damper element. An upper end portion of the damper element sleeve can be configured to engage a lower surface of the steering wheel aperture. A lower end portion of the damper element sleeve can be configured to extend axially beyond a lower surface of the lower cap and engage the head portion of the fastener or a washer fitted onto the fastener.

According to another aspect, a steering wheel assembly can include a steering wheel comprising a steering wheel armature, an airbag module, and at least one damper assembly connecting the airbag module to the steering wheel.

DRAWINGS

Further features and advantages of the invention will be evident from the following description of example embodiments with reference to the drawings, in which:

FIG. 8 is an exploded view of the damper assembly of FIG. 7.

FIG. 9 is a bottom perspective view of the damper assembly of FIG. 8 in an assembled condition.

FIG. 11 is an exploded view of the damper assembly of FIG. 10.

FIG. 12 is a bottom perspective view of the damper assembly of FIG. 11 in an assembled condition.

FIG. 13 is a sectional view of a portion of the damper assembly taken generally along line 13-13 in FIG. 10.

DESCRIPTION

Figure 1:
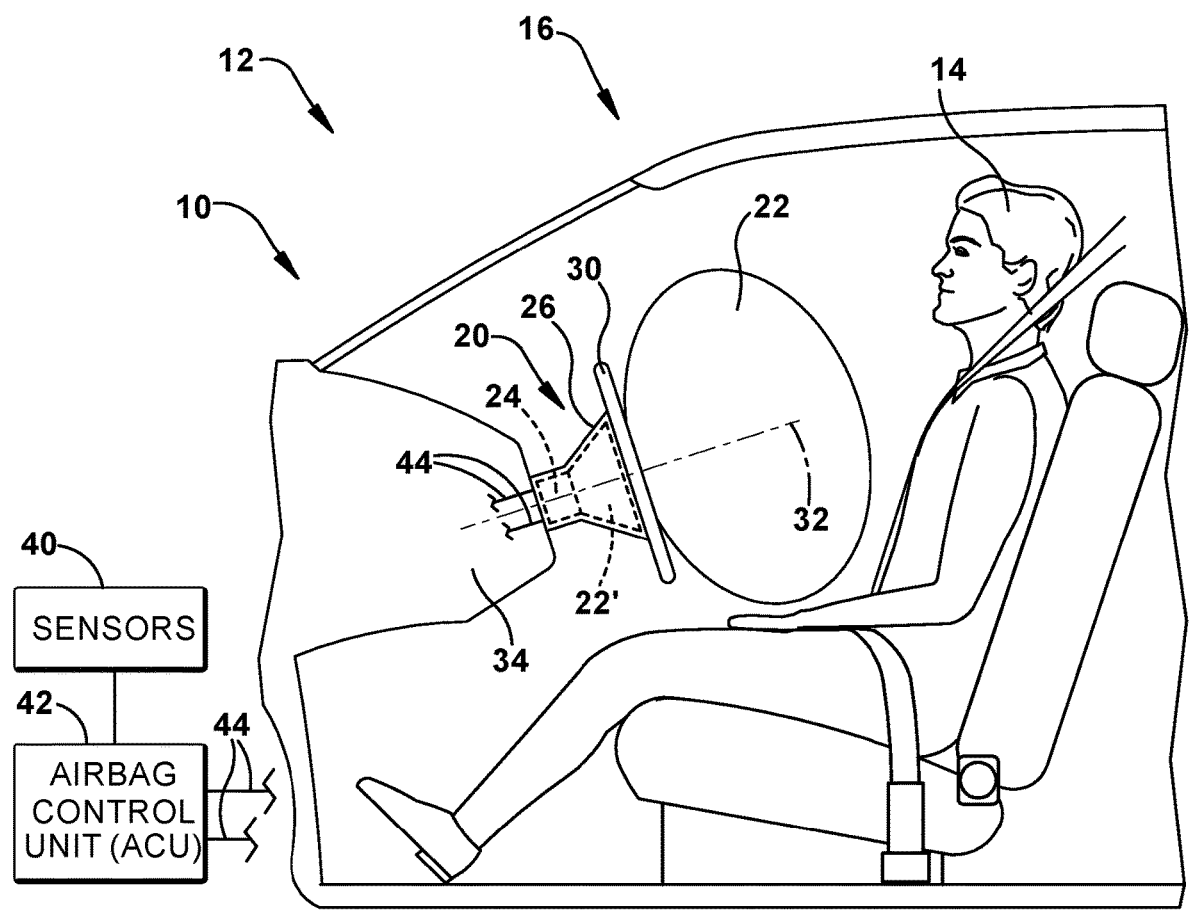
FIG. 1 is a schematic view of a vehicle safety system including a steering wheel mounted airbag module.
Figure 2:
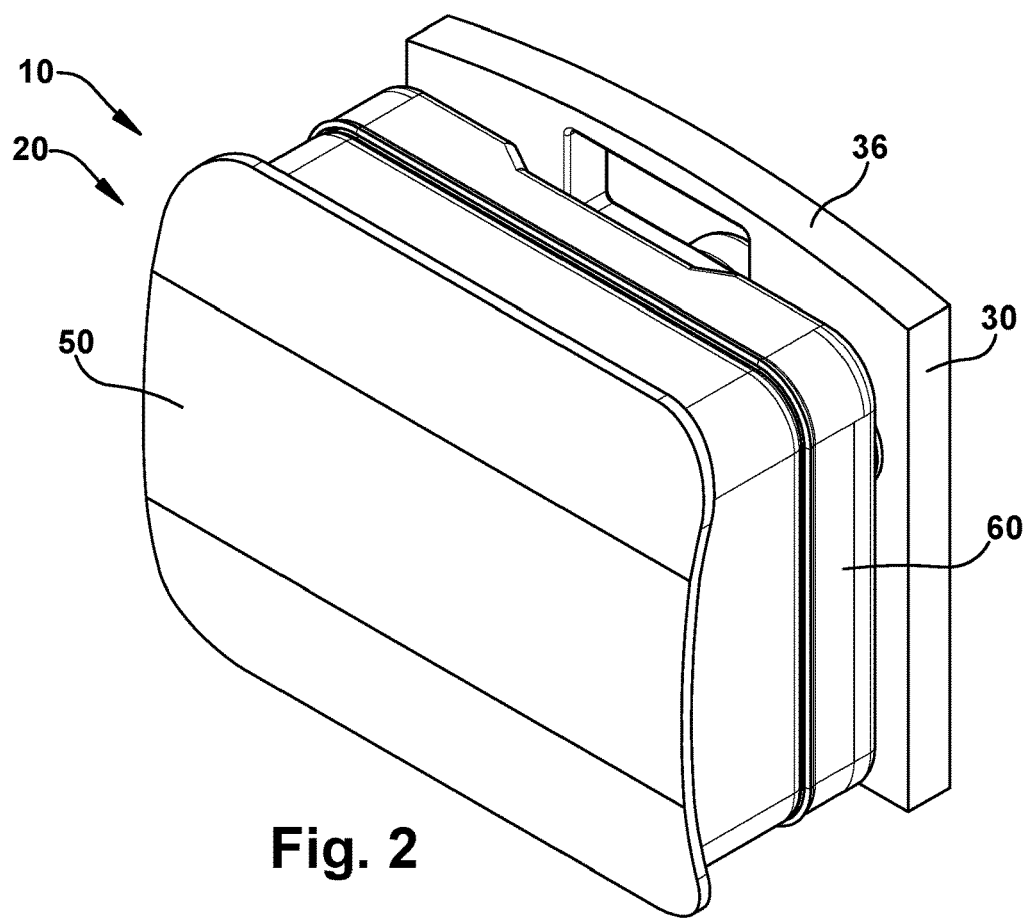
FIG. 2 is a perspective front view of the airbag module of FIG. 1 mounted to a steering wheel armature, according to an example configuration.

FIG. 1 illustrates an example configuration of a vehicle safety system 10 for helping to protect an occupant 14 of a vehicle 12. The vehicle 12 also includes a seatbelt 18 for helping to restrain the occupant 14 in a vehicle seat 28. The vehicle safety system 10 includes an airbag module 20 mounted on a steering wheel 30 of the vehicle 12 with improved vibration damping features that are described in detail herein.

The airbag module 20 includes an airbag 22, an inflation fluid source 24, such as an inflator, and a structure 26, such as a housing, for supporting the airbag 22 and inflator 24 on the steering wheel 30. The airbag has a stored condition, indicated generally in dashed lines at 22', in which the airbag is deflated, folded, and stored in the housing 26. The housing 26 may include a cover 50 (not shown in FIG. 1) that helps conceal the airbag 22 while in the stored condition.

The vehicle safety system 10 also includes sensors 40, for sensing vehicle and/or occupant conditions, and an airbag control unit ("ACU") 42 that is connected to the sensors. The ACU 42 is configured to determine the occurrence of an event for which inflation of the airbag 22 is desired, such as a collision, in response to signals received form the sensors 40. The ACU 42 is operative to actuate the inflator 24 via control wires 44 in response to this determination. When actuated, the inflator 24 inflates the airbag from the stored condition to a deployed condition illustrated generally in solid lines at 22. When the inflator 24 is actuated, the cover moves from a closed condition helping to conceal the airbag 22 in the housing 26 to an open condition allowing the airbag to inflate and deploy from the housing.

The airbag 22 inflates and deploys in a direction away from the steering wheel 30 and generally parallel to a steering axis 32 of the vehicle 12. In the deployed condition, the airbag 22 is positioned between the occupant 14 and the steering wheel 30 and between the occupant and an instrument panel 34 on the driver side 16 of the vehicle 12. The airbag 22, when in the deployed condition, helps absorb the forces of impacts with the airbag and helps distribute the impact forces throughout the airbag in order to cushion the occupant and provide a desired ride-down effect.

Figure 3:
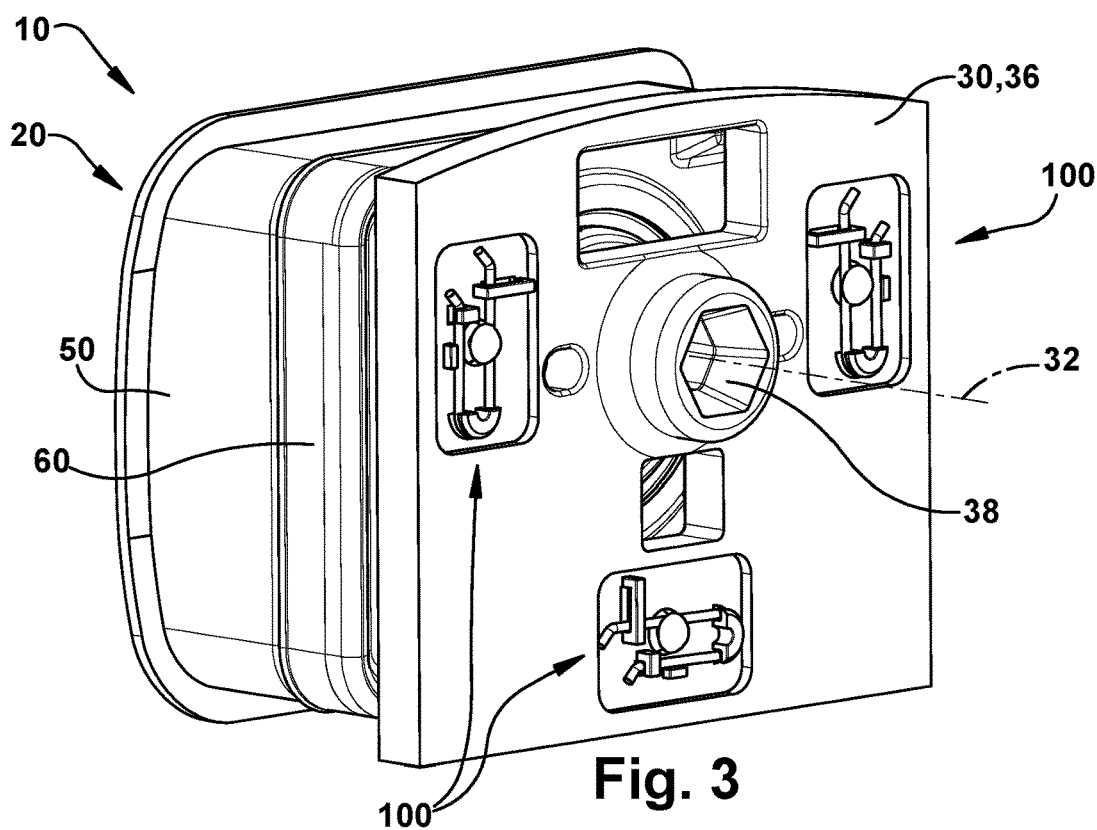
FIG. 3 is a perspective rear view of the airbag module mounted to the steering wheel armature.
Figure 4:
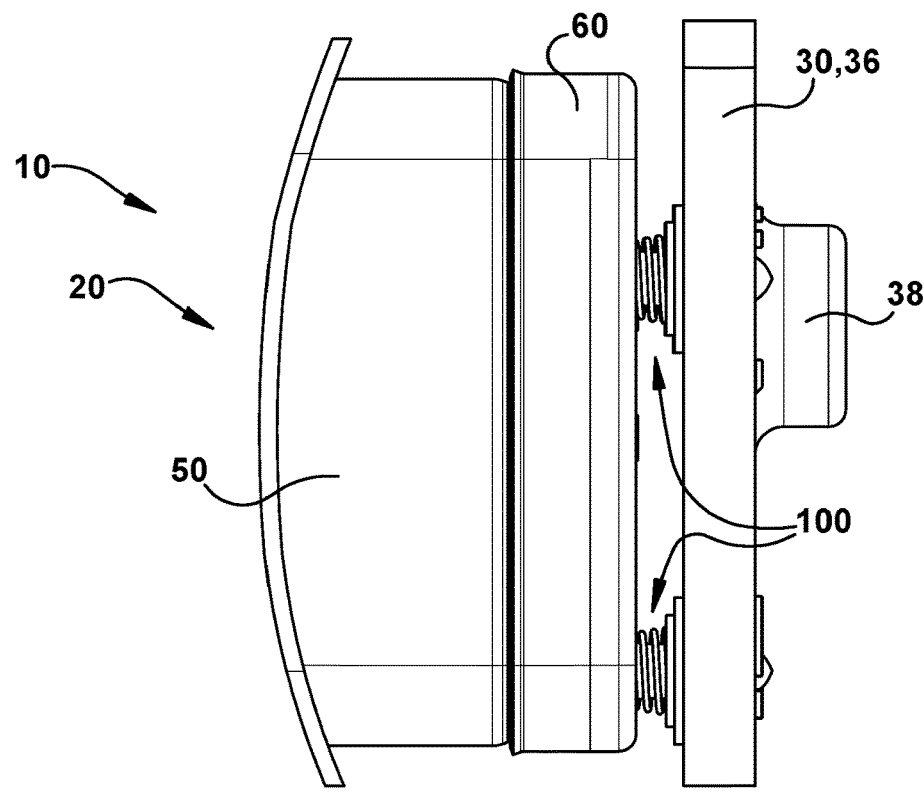
FIG. 4 is a side view of the airbag module mounted to the steering wheel armature.
Figure 5:
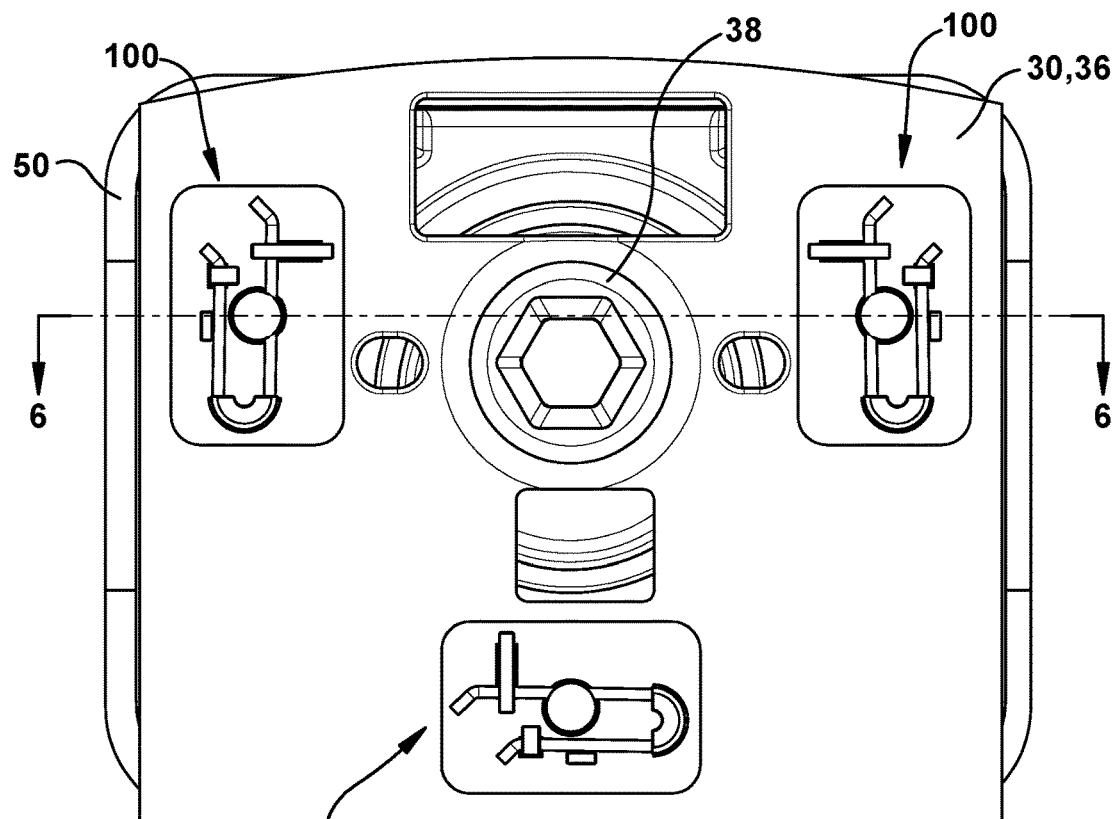
FIG. 5 is a rear view of the airbag module mounted to the steering wheel armature.

Referring to FIGS. 3-5, the airbag module 20 includes a reaction canister 60 connectable with the cover 50 to define a housing in which the airbag 22 is stored in a deflated and rolled/folded condition. The airbag module 20 is connected to the steering wheel 30, particularly to a steering wheel armature 36, which forms a central structure of the steering wheel around which the steering wheel rim (see FIG. 1) extends. The armature includes a hub 38 configured to receive a vehicle steering shaft (not shown) in an opening that is hexagonal in the example configuration. The steering axis 32 thus extends centrally through the hub 38.

Figure 6:
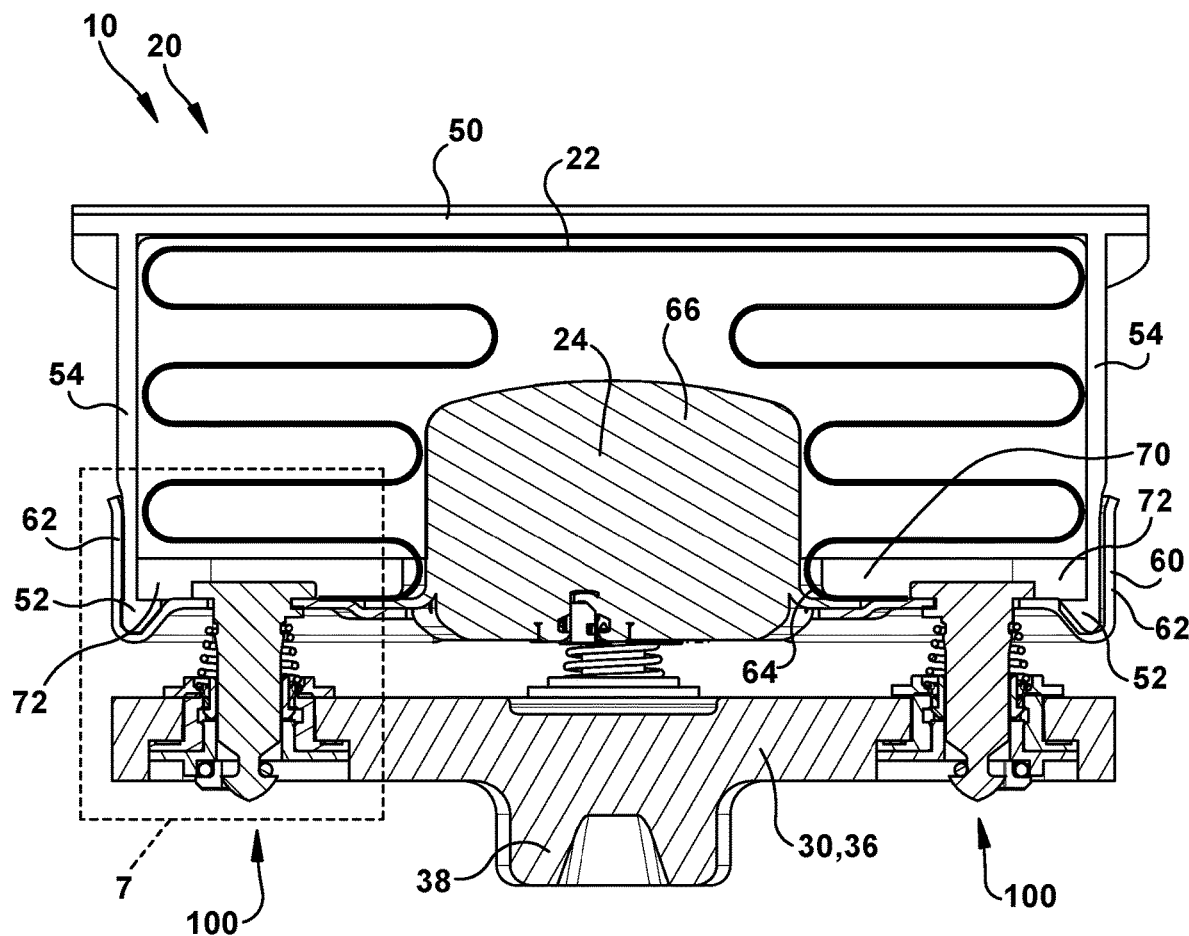
FIG. 6 is a sectional view taken generally along line 6-6 in FIG. 5, illustrating the connection of the airbag module to the steering wheel armature by damper assemblies.

Referring to FIG. 6, the airbag module 20 also includes an airbag retainer 70 that is positioned in the reaction canister 60 and encircles the inflator 24. The airbag retainer 70 impinges a mouth portion 64 of the airbag 22 against the reaction canister 60 and thereby retains the airbag and the inflator 24 in the airbag module 20 with a discharge portion 66 of the inflator positioned inside the bag. The airbag cover 28 can include latching heads 52 at a terminal end of a cover sidewall 54 that snap around a peripheral edge 72 of the airbag retainer 70 while positioned within the reaction canister 60. The airbag module 20 can be held in this assembled condition by a snap-fit in which the latching heads 52 are maintained in the engaged condition with the airbag retainer 60 by a peripheral rim 62 of the retainer.

The airbag module 20 is connected to the steering wheel 30 by damper assemblies 100 that support the airbag module in a manner such that the module acts as a damper mass that counters vibrations transferred to the steering wheel from the steering column. The damper assemblies 100 decouple the airbag module 20 from a rigid connection with the steering wheel armature 36 so that the module can move and oscillate independently of the armature. The airbag module 20 thus "floats" on the damper assemblies 100. In the example configuration illustrated herein, there are three damper assemblies 100 that connect the airbag module 20 to the steering wheel 30.

Figure 7:
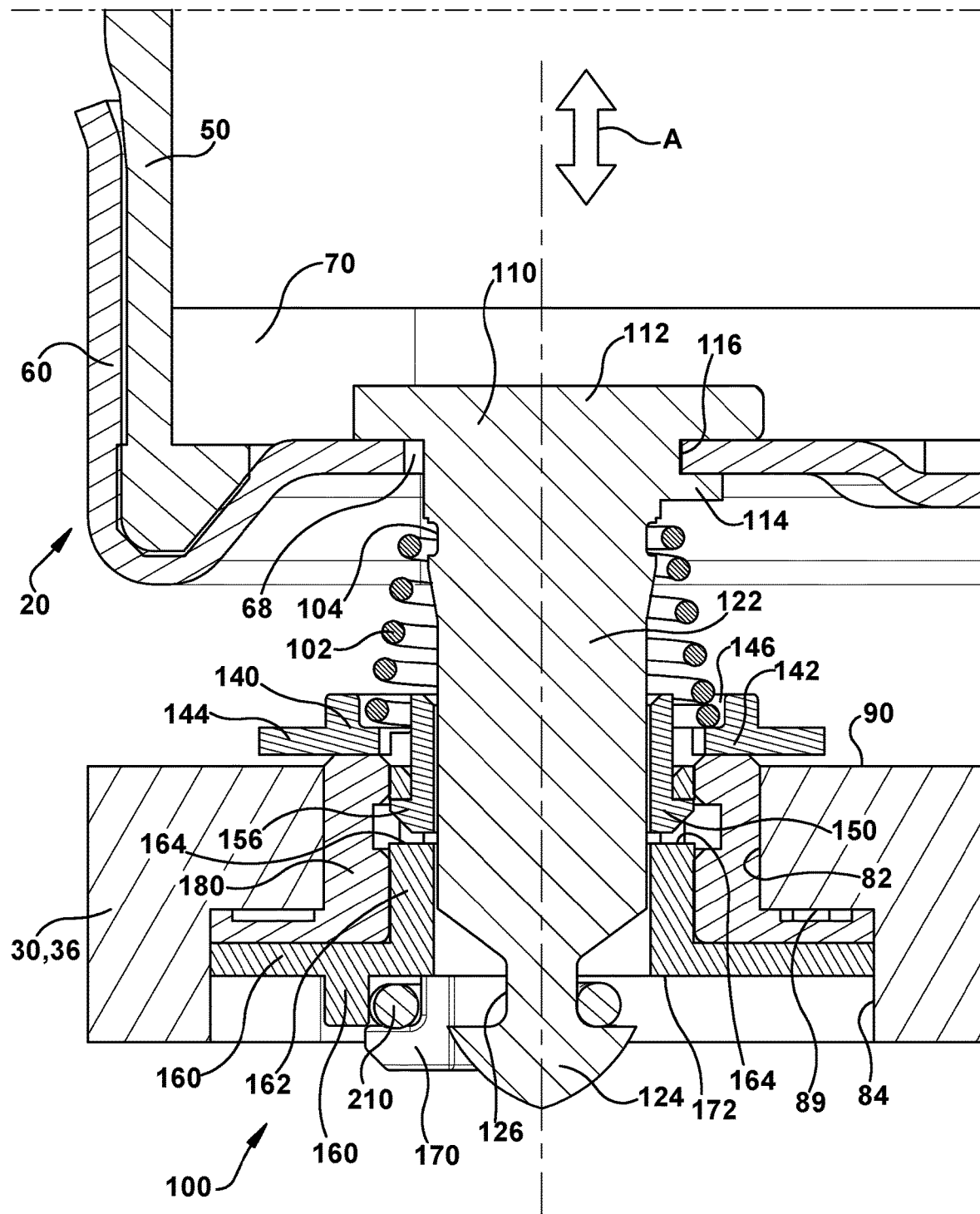
FIG. 7 is a magnified view illustrating a portion of the sectional view of FIG. 6.

The coupling of the airbag module 20 to the steering wheel armature 36 via the damper assemblies 100 is shown in greater detail in FIGS. 7-9, which illustrates a damper assembly in detail. Referring to those figures, the damper assembly 100 includes a pin 110 that is installed through an opening 68 in the reaction canister 60. The pin 110 includes a head 112 and an annular rim 114, with a slot 116 defined between. The head 112 and rim 114 include respective flats 118, 120. The flat 120 on the rim 114 permits the rim to pass through an opening 68 in the reaction canister 60. The flat 118 on the head 112 allows the head to be positioned in the airbag retainer 70. By twisting the pin 110, the flats 118, 120 rotate, which causes the slot 116 to engage and connect with the reaction canister 60. This also causes the head 112 to enter and engage a slot 74 in the airbag retainer 70. In doing so, the pin 110 is fixed to the reaction canister 60.

The pin 110 has a metal construction (e.g., steel) and includes a cylindrical shank 122 that extends from the head 112 and terminates with a tip 124 defined by a slot 126. A tapered helical spring 102 is configured to fit over the shank 122 and engage a spring retaining groove 104 adjacent the rim 114. The engagement between the spring 102 and the groove 104 can connect the spring to the pin 110. This connection can, for example, be configured to be realized through a twisting of the spring 102 while positioned in the groove 104. The pin 110 and the spring 102 therefore form an assemblage configured to connect with the airbag module 20 via the reaction canister 60.

The damper assembly 100 also includes an assemblage configured to connect with the steering wheel armature 36. The assemblage includes an upper cap 140, a lower cap 160, and a damper element 180. The assemblage is configured to be installed in an opening 80 in the armature 36. The opening 80 has a stepped configuration with a small diameter cylindrical upper sidewall 82, a large, rectangular lower sidewall 84, and an annular shoulder 86 that extends from the upper sidewall to the lower sidewall. The damper element 180 is positioned in the opening 80 and engages the upper sidewall 82, lower sidewall 84, and shoulder 86.

Referring to FIGS. 7-9, the upper cap 140 includes a disc-shaped central portion 142 that defines an annular rim 144. A circular spring receiving groove 146 extends from an upper surface of the central portion 142. A series of latching heads 150 extend from a lower surface of the central portion 142, opposite the upper surface. The upper cap 140 has a generally rigid construction, such as a molded plastic construction. For example, the upper cap 140 can have an acetal plastic (polyacetal or polyoxymethylene (POM)) construction.

The lower cap 160 includes a generally rectangular base 162 with a cylindrical pin receiving structure 164 extending from an upper surface thereof. The pin receiving structure 164 includes a plurality of latch receiving windows 166 spaced about its circumference. A plurality of retainer pin receiving structures 170 extend from a lower surface 172 of the base 162, opposite the upper surface. The lower cap 160 has a generally rigid construction, such as a molded plastic construction. For example, the lower cap 160 can have a nylon plastic construction.

The damper element 180 includes a generally rectangular base 182 with a cylindrical cap receiving sleeve 184 extending from an upper surface 186 thereof. The damper element 180 includes ribs that extend from the upper surface 186 of the base 182. Some of the ribs have a generally rectangular configuration that, generally, follows the contour of the base 182. An outer rib 192 is coextensive with and forms an outer edge 194 of the damper element 180. An inner rib 196 is spaced from both the outer rib and the cap receiving sleeve 184. A pair of ribs 198 are arc-shaped and positioned close to and following the cylindrical contour of the cap receiving sleeve 184.

The damper element 180 has a generally soft, compliant, elastic construction. For example, the damper element 180 can be molded from an elastomer material. In one example configuration, the damper element can have a molded silicon rubber construction.

To assemble the upper cap 140, lower cap 160, and damper element 180 on the steering wheel armature 36, the damper element is initially positioned on top of the lower cap with the pin receiving structure 164 extending into the cap receiving sleeve 184. The assemblage of the lower cap 160 and damper element 180 are positioned in the opening 80 in the armature 36. An outer surface of the cap receiving sleeve 184 engages the upper sidewall 82.

The damper element base 182 and the lower cap base 162 can both be rectangular and have matching dimensions. The dimensions of the damper element base 182 and the lower cap base 162 can be configured to also match the rectangular dimensions of the lower side wall 84. The outer edge 194 of the damper element base 182 can engage or partially engage the lower sidewall 84. The ribs 192, 194, and 196 engage the shoulder 86. Once the lower cap 160 and damper element 180 are positioned in the armature opening 80, the upper cap 140 is installed in the pin receiving structure 164 so that the latching heads 150 engage and snap into the latch receiving windows 166.

The damper assembly 100 is configured so that, when the upper cap 140, lower cap 160, and damper element 180 are connected to the armature 36 as shown in FIG. 7, the damper element spaces the rim 144 of the upper cap from a front/upper surface 90 of the armature, and spaces the base 162 of the lower cap from a rear/lower surface 92 of the armature, which is defined by the shoulder 86. The upper and lower caps 140, 160 are therefore spaced axially from the upper and lower surfaces 90, 92 of the armature 36.

To mount the airbag module 20 to the steering wheel armature 36 via the damper assembly 100, the spring 210 is positioned on the upper cap with its lowermost helical coil positioned in the spring receiving groove 146. The pin 110, which is pre-installed in the reaction canister 60 of the airbag module 20 is then inserted through aligned cylindrical passages in the upper cap 140 (passage 148), the lower cap 160 (passage 168), and the of the damper element 180 (passage 198). When this occurs, the uppermost helical coil of the spring 102 can be received in, or snap into, the spring retaining groove 104 in the pin 110.

At the same time, the shank 122 extends through the aligned passages 148, 168, 198 and the tip 124 protrudes from the rear or bottom surface 172 of the base 162 of the lower cap 160 so that slot 126 is exposed. At this point, a retainer pin 210 can be installed in the retainer pin receiving structures 170 of the lower cap to connect the pin 110 and the airbag module 20 to the steering wheel armature 36 via the damper assembly 100. As shown in FIG. 9, the retainer pin 210 has a generally U-shaped configuration with a pair of generally parallel legs 212 connected by a base 214 with a semi-circular configuration. The base 214 is received in a pin receiving structure 170 having a semi-circular channel that mates with the shape of the base. The legs 212 are received in respective pin receiving structures 170 with apertures through which the respective legs extend. Bent ends of the legs 212 help prevent removal of the retainer pin 210

When the airbag module 20 is installed and connected on the steering wheel 30 via the damper assemblies 100 as shown in FIG. 7, the module floats on the springs 102. This permits the airbag module 20 to be pushed toward the steering wheel 30 against the bias of the springs 102 so that the module can function as a horn switch actuator. The movement of the airbag module 20 against the spring bias is limited by the configuration of the slot 126 and its interaction with the retainer pin 210. At the same time, the damper assemblies 100, specifically the damper elements 180, isolate the airbag module 20 and the from the steering wheel 30, the steering wheel armature 36, and the steering shaft/column to which the steering wheel is connected.

As shown in FIG. 7, the airbag module 20 is isolated by the damper element 180 for axial movement, as indicated by the arrows labeled A in FIG. 7, as well as in directions transverse to that axis. The axial direction indicated by arrow A in FIG. 7 is parallel to the steering axis 32, which coincides with the axis of the steering shaft/column. The damper assemblies 100 adjust the natural frequency of the steering wheel/steering column system so that it is within an uncritical range by using the airbag module 20 as a damper mass that counter-oscillates vibrations imparted to the steering wheel through the steering column.

The damper assemblies 100 are configured so that the mechanical interface between the steering wheel armature 36 and the airbag module 20 is only through the vibration-damping material of the damper element 180. The damper element 180 is the only structure that engages the armature to couple the airbag module 20 axially to the steering wheel 30. At the upper surface 90 of the armature 36, the airbag module 20 is supported via the upper cap 140 by the cap receiving sleeve 184 of the damper element 180. At the lower surface 92 of the armature 36, the airbag module 20 is supported via the lower cap 160 by the ribs 196 on the base 182 of the damper element 180.

Advantageously, the ribs 196 help improve the vibration damping capabilities of the damper assemblies 100. Because the ribs 196 reduce the surface area of the engagement with the lower surface 92 of the steering wheel armature 36, any forces urging the airbag module 20 to move the lower cap 160 axially toward the armature 36 will produce a pressure on the ribs (force per unit area) that is increased over that which would be applied if the armature engaged the entire base 182 of the damper element 180. As a result, the damper element 180 is more easily deformed. The same is true with the engagement between the upper cap 140 and the cap receiving sleeve 184, which presents a small area of engagement.

Because the damper assembly 100 is configured, as described above, for increases or enhances deformation in response to axial movements of the airbag module 20, it will be appreciated that vibration forces will similarly produce enhanced deformation. It is this deformation that decouples the airbag module from the steering wheel 30 and allows it to function as a damper mass that counters vibrations applied to the steering wheel via the steering column. The damper element 180, therefore improves the vibration damping characteristics of the damper assembly 100.

Another configuration of the damper assembly 100 is illustrated in FIGS. 10-13. In the example configuration of FIGS. 10-13, the airbag module 20 is mounted to the steering wheel armature 36 via the damper assembly 100 in a manner that is identical to that described above in regard to the example configuration of FIGS. 1-9. The configuration of the damper assembly 100 of FIGS. 10-13 differs from the assembly illustrated in FIGS. 1-9 in that the assembly includes fasteners 200 for providing an additional connection of the damper assembly to the steering wheel 30, particularly to the steering wheel armature 36. In the example configuration of FIGS. 10-13, the damper assembly 100 includes three fasteners 200 for making this connection. The damper assembly 100 could, however, include a different number of fasteners 200, i.e., greater than or less than three fasteners.

The additional connections afforded by the fasteners 200 can be used in scenarios where the sole connection of the airbag module 20 via the engagement of the pin 210 with the pin 110 might not produce a sufficiently robust and reliable connection. This can be the case, for example, in a vehicle that undergoes significant steering shaft vibrations, such as an off-road vehicle or a commercial service vehicle.

To facilitate connecting the damper assembly 100 to the steering wheel armature 36 via the fasteners 200, the lower cap 160 and damper element 180 include respective openings 210, 212 through which the fastener can extend. The number of openings 210, 212 in the lower cap 160 and damper element 180 can correspond to the number of fasteners included in the damper assembly 100. In the assembled and installed condition of the damper assembly 100, the fasteners 200 extend through the aligned openings 210, 212 in the lower cap 160 and damper element 180, with washers 220 optionally positioned on the fasteners 200.

In the example configuration of FIGS. 10-13, the fasteners 200 are shoulder screws, each of which includes a head portion 202, a shoulder portion 204, and a threaded shank portion 206. In the installed condition of the damper assembly 100, the head portion 202 engages the washer 220, which is positioned against an annular portion of the lower cap 160 that surrounds the opening 210. The shoulder portion 204 extends through the washer 220 and the aligned openings 210, 212 in the lower cap 160 and damper element 180. The shoulder portion 204 engages the steering wheel armature 36.

As shown in FIG. 13, the opening 212 in the damper element 180 is formed by an annular sleeve 230 formed as an integral portion of the damper element. The sleeve 230 is configured to protrude from the base 182 of the damper element on both sides, so that an upper portion 232 engages the steering wheel armature 36, and a lower portion 234 protrudes from the lower cap 160 and engages the washer 220/fastener 200. Because the shoulder portion 204 engages the steering wheel armature 36, the fastener 200 does not compress the damper element 180, particularly the sleeve 230. As such, while the fasteners 200 connect the damper assemblies 100, and, thus, the airbag module 20, to the steering wheel 30, the airbag module remains completely isolated from the steering wheel by the damper elements 180.

In the assembled and installed condition of the damper assembly 100, the fastener 200 is connected to the steering wheel armature 36 through a threaded connection with the shank portion 206, with the shoulder portion 204 tightened against the armature. The fastener 200 thus essentially becomes a rigid extension of the steering wheel armature 36. The damper element 180 is the only structure of the damper assembly 100 that engages both the armature 36/fastener 200 and the assemblage of the upper cap 140 and the lower cap 160. Because the airbag module 20 is connected to the assemblage of the upper and lower caps 140, 160 via the pin 110, the airbag module 20 is completely isolated from the steering wheel armature 36 by the damper element 180 of the damper assembly 100.

When the airbag module 20 is installed and connected on the steering wheel 30 via the damper assemblies 100 as shown in FIGS. 10-13, the module floats on the springs 102. This permits the airbag module 20 to be pushed toward the steering wheel 30 against the bias of the springs 102 so that the module can function as a horn switch actuator. The movement of the airbag module 20 against the spring bias is limited by the configuration of the slot 126 and its interaction with the retainer pin 210. At the same time, the damper assemblies 100, specifically the damper elements 180, isolate the airbag module 20 and the from the steering wheel 30, the steering wheel armature 36, and the steering shaft/column to which the steering wheel is connected.

Figure 10:
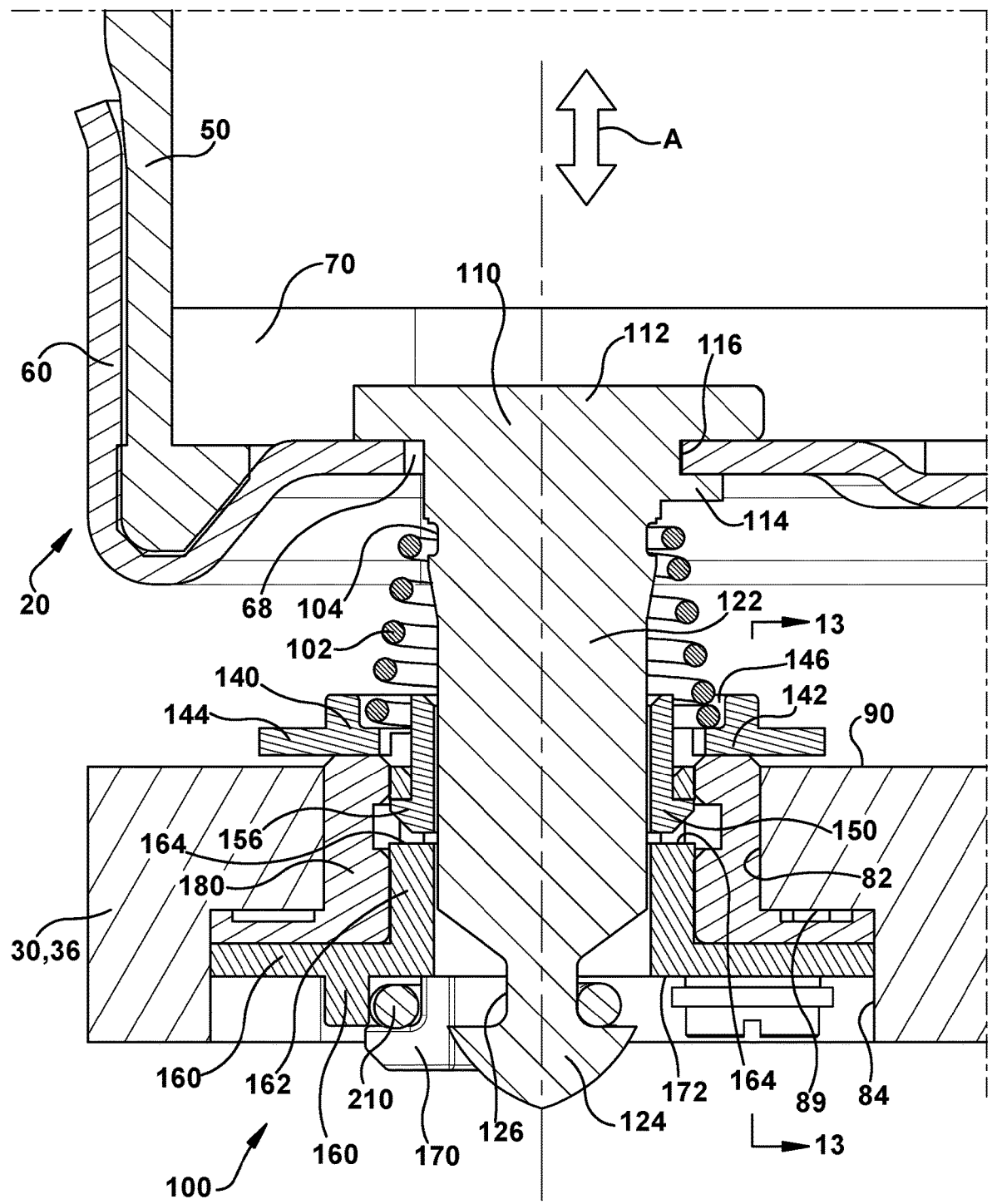
FIG. 10 is a magnified view illustrating a sectional view of a portion of the airbag module, according to another example configuration.

As shown in FIGS. 10-13, the airbag module 20 is isolated by the damper element 180 for axial movement, as indicated by the arrows labeled A in FIG. 10, as well as in directions transverse to that axis. The damper assembly 100 maintains this isolation, despite the added fasteners 200, by implementing the sleeve 230 in the damper element 180, which forms the sole fastener engaging structure of the damper assembly. The axial direction indicated by arrow A in FIG. 10 is parallel to the steering axis 32, which coincides with the axis of the steering shaft/column. The damper assemblies 100 adjust the natural frequency of the steering wheel/steering column system so that it is within an uncritical range by using the airbag module 20 as a damper mass that counter-oscillates vibrations imparted to the steering wheel through the steering column.

Like the example configuration of FIGS. 1-9, the damper assemblies 100 are configured so that the mechanical interface between the steering wheel armature 36 and the airbag module 20 is only through the vibration-damping material of the damper element 180. The damper element 180 is the only structure that engages the armature 36/fastener 200 to couple the airbag module 20 axially to the steering wheel 30. At the upper surface 90 of the armature 36, the airbag module 20 is supported via the upper cap 140 by the cap receiving sleeve 184 of the damper element 180. At the lower surface 92 of the armature 36, the airbag module 20 is supported via the lower cap 160 by the ribs 196 on the base 182 of the damper element 180.

Advantageously, the ribs 196 help improve the vibration damping capabilities of the damper assemblies 100. Because the ribs 196 reduce the surface area of the engagement with the lower surface 92 of the steering wheel armature 36, any forces urging the airbag module 20 to move the lower cap 160 axially toward the armature 36 will produce a pressure on the ribs (force per unit area) that is increased over that which would be applied if the armature engaged the entire base 182 of the damper element 180. As a result, the damper element 180 is more easily deformed. The same is true with the engagement between the upper cap 140 and the cap receiving sleeve 184, which presents a small area of engagement.

Because the damper assembly 100 is configured, as described above, for increases or enhances deformation in response to axial movements of the airbag module 20, it will be appreciated that vibration forces will similarly produce enhanced deformation. It is this deformation that decouples the airbag module from the steering wheel 30 and allows it to function as a damper mass that counters vibrations applied to the steering wheel via the steering column. The damper element 180, therefore improves the vibration damping characteristics of the damper assembly 100.

From the above description of the invention, those skilled in the art will perceive improvements, changes and modifications. Such improvements, changes and modifications within the skill of the art are intended to be covered by the appended claims.

The invention claimed is:

1. A damper assembly configured to mount an airbag module to a steering wheel including a steering wheel armature, comprising:
   a damper element configured to engage the steering wheel armature and to extend through an opening in the steering wheel armature;
   a pin configured to be connected to the airbag module;
   a cap structure configured to extend through the opening in the steering wheel armature, the cap structure being configured to receive the pin for axial movement so that the airbag module can move axially relative to the steering wheel armature, the cap structure comprising:
   a lower cap configured to overlie the damper element on a lower surface of the steering wheel armature, the lower cap extending at least partially through the damper element and the opening in the steering wheel armature;
   an upper cap configured to overlie and engage a portion of the damper element extending above an upper surface of the steering wheel armature, the upper cap extending at least partially through the damper element and the opening in the steering wheel armature, and being configured to engage and lock onto the lower cap to connect the upper cap, the lower cap, and the damper element to the steering wheel armature; and
   wherein the damper element isolates the airbag module, the pin, and the cap structure from the steering wheel armature.

2. The damper assembly recited in claim 1, wherein the damper element is configured to engage the lower surface of the steering wheel armature, to extend through the opening in the steering wheel armature, and to have the portion of the damper element that extends from the opening above an upper surface of the steering wheel armature.

3. The damper assembly recited in claim 1, wherein the damper element isolates the airbag module from the steering wheel armature on both the upper surface and the lower surface of the armature.

4. The damper assembly recited in claim 1, wherein the pin is configured to extend through the upper cap, the damper element, and the lower cap to connect the airbag module to the steering wheel aperture.

5. The damper assembly recited in claim 4, further comprising a spring that encircles a portion of the pin, the spring having a lower end that engages the upper cap and an upper end proximate to and engages, directly or indirectly, the airbag module, wherein the spring allows the airbag module to move axially relative to the steering wheel armature.

6. The damper assembly recited in claim 1, further comprising a spring that encircles a portion of the pin, wherein the airbag module is configured to move axially relative to the steering wheel armature against a bias of the spring.

7. The damper assembly recited in claim 6, wherein the spring allows the airbag module to function as a horn switch actuator.

8. The damper assembly recited in claim 1, further comprising a retainer pin that engages retainer pin receiving structures on a lower surface of the lower cap, the retainer pin engaging a slot in the pin to secure the connection of the airbag module to the steering wheel armature.

9. The damper assembly recited in claim 1, wherein the damper element comprises a base that engages the lower surface of the steering wheel armature, the lower cap comprising a base that overlies the damper element base, positioning the damper element base between the lower cap base and the lower surface of the steering wheel armature.

10. The damper assembly recited in claim 9, wherein the damper element comprises a plurality of ribs that extend from an upper surface of the damper element base and engage the lower surface of the steering wheel armature.

11. The damper assembly recited in claim 9, wherein the damper element comprises a cylindrical sleeve that extends from an upper surface of the damper element base, the sleeve being configured to be positioned in and engage a sidewall of the opening in the steering wheel armature.

12. The damper assembly recited in claim 11, wherein the sidewall of the steering wheel armature comprises a small diameter upper sidewall, a large diameter lower sidewall, and an annular shoulder that extends from the upper sidewall to the lower sidewall, the lower surface of the steering wheel armature that the damper element base engages being the shoulder.

13. The damper assembly recited in claim 11, wherein the damper element sleeve is configured to extend from the opening in the steering wheel armature above the upper surface of the steering wheel armature.

14. The damper assembly recited in claim 13, wherein the upper cap is configured to support the airbag module via the spring on an upper end portion of the cylindrical sleeve of the damper element.

15. The damper assembly recited in claim 14, wherein the upper end portion of the cylindrical sleeve of the damper element spaces an annular rim portion of the upper cap from the upper surface of the steering wheel armature.

16. The damper assembly recited in claim 1, wherein:
the upper cap comprises an annular rim and a plurality of latches that extend from a lower surface of the annular rim into a cylindrical sleeve of the damper element;
the lower cap comprises a cylindrical pin receiving structure that extends upward from a base plate into the cylindrical sleeve of the damper element;
wherein latches of the upper cap engage latch windows in the pin receiving structure to connect the upper cap to the lower cap with the annular rim of the upper cap engaging an upper end portion of the cylindrical sleeve of the damper element, and the base plate of the lower cap engaging a base of the damper element.

17. The damper assembly recited in claim 1, further comprising a fastener that extends through aligned fastener receiving openings in the lower cap and the damper element to connect the damper assembly to the steering wheel aperture, wherein the damper assembly is configured so that an only component of the damper assembly in direct engagement with the fastener is the damper element.

18. The damper assembly recited in claim 17, wherein the damper assembly is configured so that the damper element isolates the airbag module from the fastener.

19. The damper assembly recited in claim 17, wherein the fastener comprises a head portion, a shoulder portion, and a threaded shank, wherein the threaded shank is configured to be installed in a corresponding threaded opening in the steering wheel armature and the shoulder portion is configured to engage and be tightened against the steering wheel armature.

20. The damper assembly recited in claim 17, wherein the damper element comprises a sleeve portion that extends through the fastener receiving opening in the lower cap, wherein the damper assembly is configured so that a shoulder portion of the fastener engages a sleeve portion of the damper element, wherein an upper end portion of the damper element sleeve is configured to engage the lower surface of the steering wheel aperture, and wherein a lower end portion of the damper element sleeve is configured to extend axially beyond a lower surface of the lower cap and engage a head portion of the fastener or a washer fitted onto the fastener.

21. A steering wheel assembly comprising:
a steering wheel comprising a steering wheel armature;
an airbag module; and
at least one damper assembly connecting the airbag module to the steering wheel, wherein the at least one damper assembly is constructed according to claim 1.

22. The damper assembly recited in claim 1, wherein the upper cap and the lower cap include passages that are aligned with each other when the upper cap is locked onto the lower cap, wherein the pin is configured to extend through the aligned passages with an outer surface of the pin directly facing an inner surface of the passages.

* * * * *